United States Patent
Uraoka

(10) Patent No.: US 11,919,493 B2
(45) Date of Patent: Mar. 5, 2024

(54) BRAKE CONTROL DEVICE

(71) Applicant: ADVICS CO., LTD., Kariya (JP)

(72) Inventor: Terushige Uraoka, Takahama (JP)

(73) Assignee: ADVICS CO., LTD., Kariya (JP)

( * ) Notice: Subject to any disclaimer, the term of this patent is extended or adjusted under 35 U.S.C. 154(b) by 864 days.

(21) Appl. No.: 16/969,746

(22) PCT Filed: Mar. 8, 2019

(86) PCT No.: PCT/JP2019/009469
§ 371 (c)(1),
(2) Date: Aug. 13, 2020

(87) PCT Pub. No.: WO2019/188141
PCT Pub. Date: Oct. 3, 2019

(65) Prior Publication Data
US 2021/0001830 A1    Jan. 7, 2021

(30) Foreign Application Priority Data
Mar. 26, 2018 (JP) .................... 2018-058848

(51) Int. Cl.
*B60T 8/17* (2006.01)
*B60T 13/74* (2006.01)
(Continued)

(52) U.S. Cl.
CPC .............. *B60T 17/221* (2013.01); *B60T 8/17* (2013.01); *B60T 13/74* (2013.01); *B60T 13/58* (2013.01);
(Continued)

(58) Field of Classification Search
CPC .......... B60T 17/221; B60T 8/17; B60T 13/74; B60T 13/58; B60T 2270/413;
(Continued)

(56) References Cited

U.S. PATENT DOCUMENTS

2015/0061365 A1* 3/2015 Sakashita .............. B60T 13/588
303/15
2015/0120163 A1* 4/2015 Ohara ..................... F16D 65/18
701/70

(Continued)

FOREIGN PATENT DOCUMENTS

CN        104417520 A    3/2015
JP        2016011081 A   1/2016

OTHER PUBLICATIONS

International Search Report (PCT/ISA/210) dated Jun. 4, 2019, by the Japanese Patent Office as the International Searching Authority for International Application No. PCT/JP2019/009469.

(Continued)

*Primary Examiner* — Robert T Nguyen
(74) *Attorney, Agent, or Firm* — BUCHANAN INGERSOLL & ROONEY PC

(57) ABSTRACT

A brake control device to be applied to a vehicle having a hydraulic brake generating a hydraulic braking force, which is a braking force converted from a fluid pressure to a wheel of the vehicle, and an electric parking brake generating an electric braking force, which is a braking force different from the hydraulic braking force, on the wheel by a wheel brake mechanism driven by a motor. The brake control device includes an electric parking brake controller for determining a current target value, which is a target value of an electric current through the motor, by using a target braking force, and for controlling the electric parking brake by using the current target value. The electric parking brake controller is configured to estimate the fluid pressure in the hydraulic brake by using a current detection value, which is a detection value of an electric current through the motor.

7 Claims, 9 Drawing Sheets

(51) Int. Cl.
*B60T 17/22* (2006.01)
*B60T 13/58* (2006.01)
(52) U.S. Cl.
CPC ..... *B60T 2270/413* (2013.01); *B60T 2270/88* (2013.01)
(58) Field of Classification Search
CPC .... B60T 2270/88; B60T 13/686; B60T 13/52; B60T 13/741; B60T 8/00; F16D 2121/04; F16D 2121/24; F16D 2125/06; F16D 2125/48; F16D 65/18
See application file for complete search history.

(56) References Cited

U.S. PATENT DOCUMENTS

| | | | |
|---|---|---|---|
| 2015/0142288 A1* | 5/2015 | Sato | B60T 7/18 |
| | | | 701/70 |
| 2019/0039579 A1* | 2/2019 | Ohkubo | B60T 13/586 |
| 2021/0269001 A1* | 9/2021 | Suzuki | B60T 8/329 |
| 2022/0073038 A1* | 3/2022 | Suzuki | F16D 65/18 |
| 2022/0355771 A1* | 11/2022 | Fujita | B60T 17/22 |
| 2023/0126047 A1* | 4/2023 | Kojima | B60T 13/74 |
| | | | 318/473 |

OTHER PUBLICATIONS

Written Opinion (PCT/ISA/237) dated Jun. 4, 2019, by the Japanese Patent Office as the International Searching Authority for International Application No. PCT/JP2019/009469.

\* cited by examiner

MAP 1

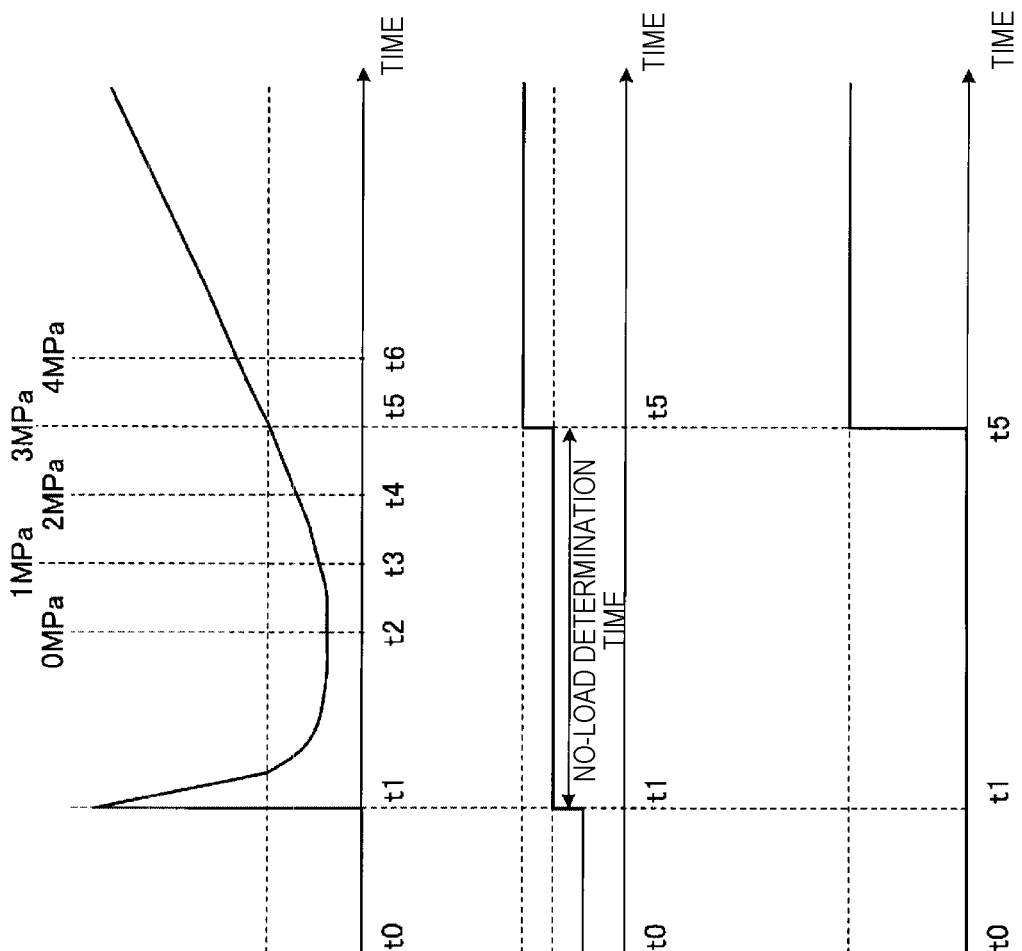

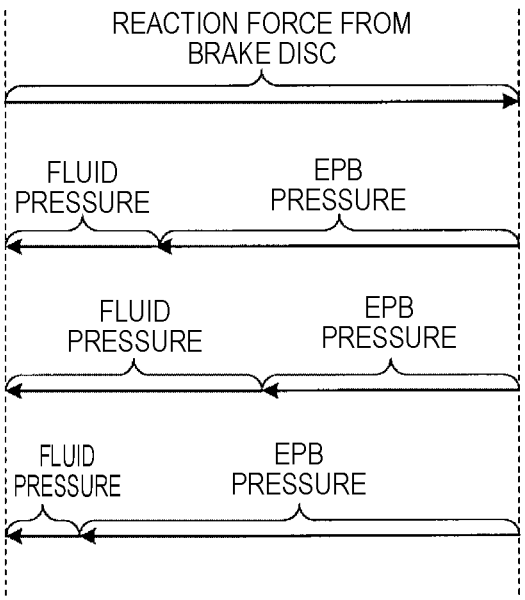

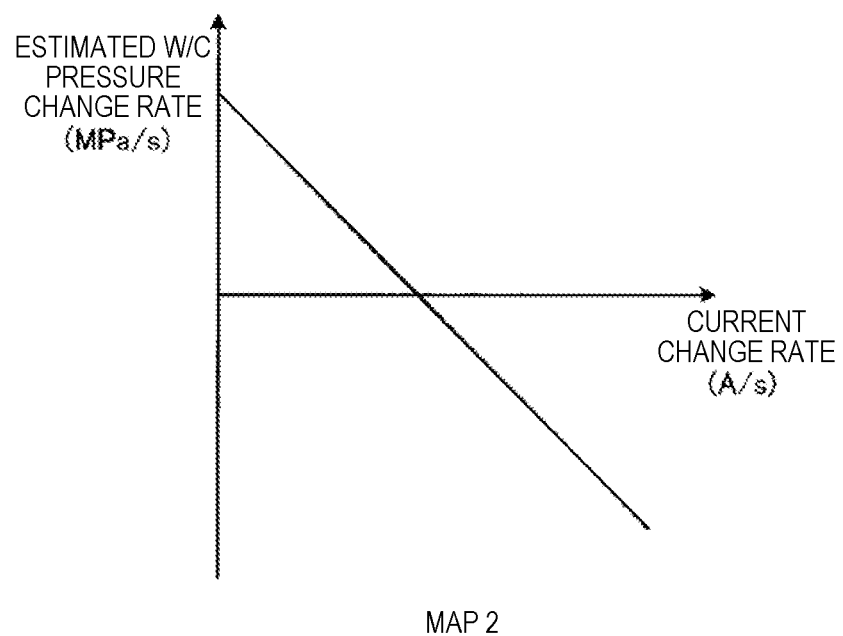

FIG. 8A
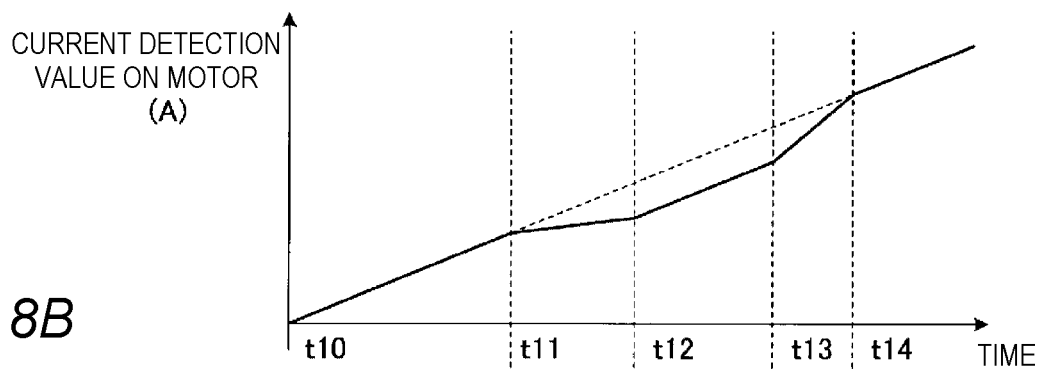
FIG. 8B
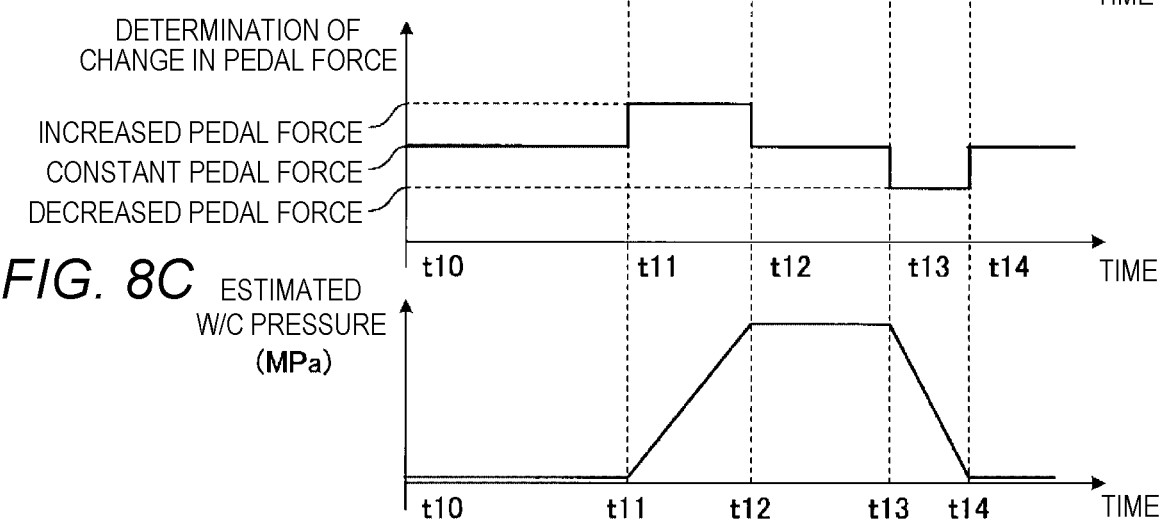
FIG. 8C

ND DEVICE

TECHNICAL FIELD

The present application relates to a brake control device.

BACKGROUND ART

Electric parking brakes (EPB) have been widely used in various vehicles including passenger cars recently. A brake control device for controlling the EPB generates an electric parking brake force, for example, by driving a wheel brake mechanism using a motor.

Some conventional brake control devices determine a current target value that is a target value of an electric current through the motor when the electric parking brake force is generated. And the brake control devices control the electric current through the motor in such a manner that a current detection value through the motor becomes the current target value.

If a driver depresses a brake pedal while the electric parking brake force is generated, a hydraulic brake force is also generated by a hydraulic brake mechanism. In this situation, the electric parking brake force is generated along with the hydraulic brake force. Consequently, a surplus braking force may be generated. Accordingly, the conventional technique may reduce the electric parking brake force depending on a fluid pressure of a brake fluid detected by a fluid pressure sensor.

CITATION LIST

Patent Literature

PTL 1: Japanese Patent Application Publication No. 2016-11081

SUMMARY OF INVENTION

Technical Problem

In the conventional technique, a fluid pressure detection value is required to detect correctly by the fluid pressure sensor. Accordingly, there is a problem that the conventional technique cannot cope with such a situation if the fluid pressure detection value is not detected correctly by the fluid pressure sensor.

Therefore, one of objects of the present application is to provide a brake control device, which is capable of estimating a fluid pressure in a hydraulic brake even if a fluid pressure detection value is not detected correctly by a fluid pressure sensor.

Solution to Problem

The present application is directed to a brake control device to be applied to, for example, a vehicle having a hydraulic brake capable of generating a hydraulic braking force, which is a braking force converted from a fluid pressure to a wheel of the vehicle, and an electric parking brake capable of generating an electric braking force, which is a braking force different from the hydraulic braking force, on the wheel by a wheel brake mechanism driven by a motor, wherein the brake control device includes an electric parking brake controller for determining a current target value, which is a target value of an electric current through the motor, by using a target braking force, and for controlling the electric parking brake by using the current target value. The electric parking brake controller is configured to estimate the fluid pressure in the hydraulic brake by using a current detection value, which is a detection value of an electric current through the motor.

BRIEF DESCRIPTION OF DRAWINGS

FIGS. 5A to 5C are graphs explaining estimation of a W/C pressure in a no-load state according to the embodiment.

FIGS. 6A to 6C are explanatory views of a relationship between a change in pedal force and a change in fluid pressure or EPB pressure according to the embodiment.

FIG. 7 is a map 2 showing a relationship between a current change rate and an estimated W/C pressure change rate according to the embodiment.

FIGS. 8A to 8C are graphs explaining estimation of a W/C pressure in a load-applied state according to the embodiment.

DESCRIPTION OF EMBODIMENTS

Exemplary embodiments of the present application are disclosed hereinafter. Configurations of the embodiments described below and thus the operation, results, and effects obtained from the configurations are only examples. The present application can also be implemented with configurations other than configurations disclosed in the following embodiments. Further, according to the present application, it is possible to obtain at least one of various effects including derivative one obtained by the configurations as described below.

Figure 1:
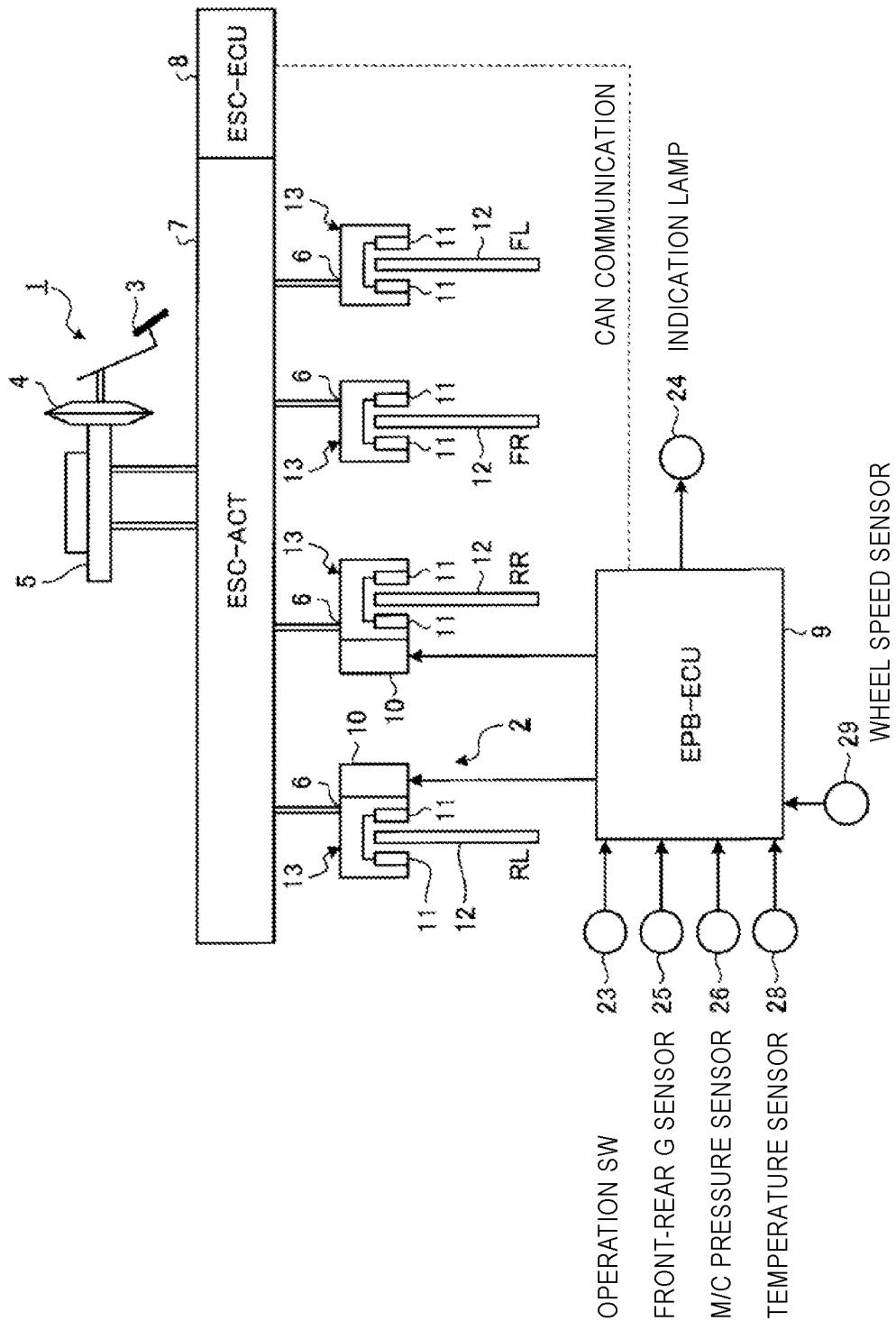
FIG. 1 is a schematic view showing the overall outline of a vehicle brake device according to an embodiment.
Figure 2:
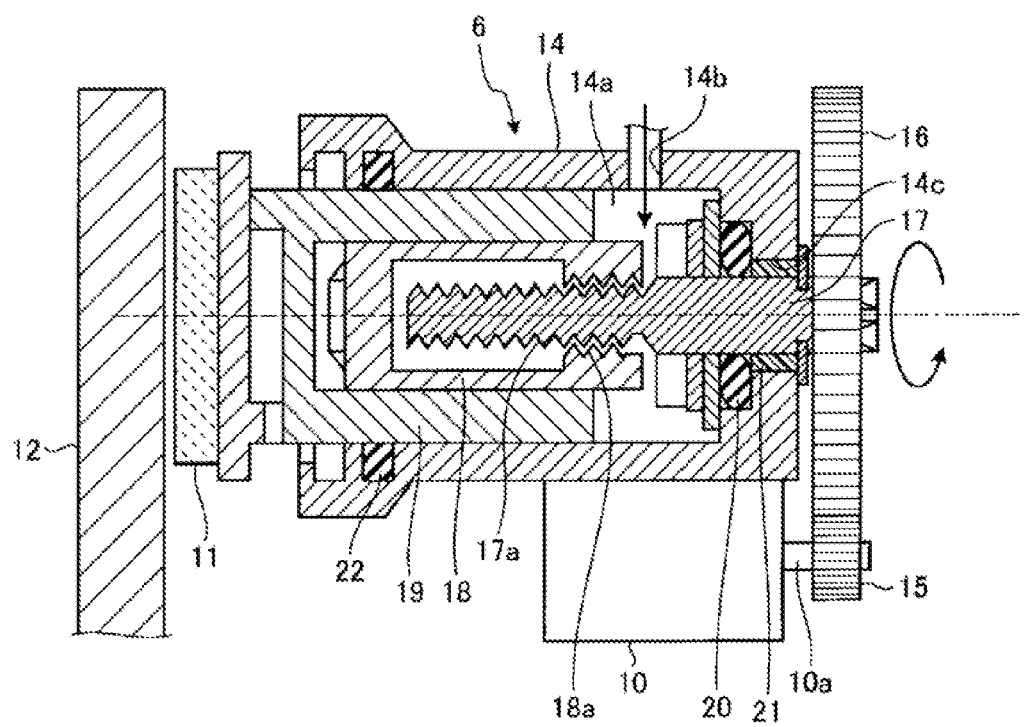
FIG. 2 is a schematic sectional view of a rear wheel brake mechanism equipped in the vehicle brake device according to the embodiment.

In the present embodiment, a vehicle brake device having a disc brake-type EPB on rear wheels will be described by way of example. FIG. 1 is a schematic view showing an overall outline of a vehicle brake device according to the embodiment. FIG. 2 is a schematic sectional view of a rear wheel brake mechanism equipped in the vehicle brake device according to the embodiment. Description will be made with reference to the figures hereinafter.

As shown in FIG. 1, the vehicle brake device according to the embodiment has a service brake 1 generating a service brake force (i.e., hydraulic braking force) by using a pedal force by a driver, and an EPB 2 restricting movement of a vehicle during parking or the like.

The service brake 1 is a mechanism for generating the brake fluid pressure by using depressing of the brake pedal 3 by the driver and then for generating the service brake force using the brake fluid pressure. Specifically, the service brake 1 boosts a pedal force that corresponds to depressing of the brake pedal 3 by using a boosting device 4, and then generates the brake fluid pressure that corresponds to the boosted pedal force in a master cylinder (M/C) 5. Then, the service brake force is generated by delivering the brake fluid pressure to a wheel cylinder (W/C) 6 equipped in a wheel brake mechanism of each of wheels. Also, an actuator 7 controlling the brake fluid pressure is provided between the M/C 5 and the W/C 6. The actuator 7 adjusts the service brake force generated by the service brake 1 and thus executes varieties of control (e.g., anti-skid control or the like) for enhancing the safety of the vehicle.

An Electronic Stability Control—an electronic control unit (ESC-ECU) 8 controlling the service brake force executes varieties of control by using the actuator 7. The ESC-ECU 8 outputs a control current for controlling various control valves (not shown) equipped in the actuator 7 or a motor for driving a pump, thereby controlling a hydraulic circuit equipped in the actuator 7 and thus controlling a W/C pressure to be delivered to the W/C 6. In this way, it is possible to perform avoiding of a wheel slip and the like, thereby enhancing the safety of the vehicle. The actuator 7 has a pressure supply control valve that controls pressurizing a W/C pressure of a wheel. The W/C pressure is pressurized by the M/C 5 or by a pump. The actuator 7 has a pressure release control valve that controls depressurizing the W/C pressure of the wheel. The W/C pressure is depressurized by delivering the brake fluid from the W/C to a reservoir. This enable the W/C pressure to pressurize, hold, depressurize. In addition, the actuator 7 has an automatic pressurization function of the service brake 1. The W/C 6 can be automatically pressurized by controlling the pump and various control valves even if there is no brake operation. Since the configuration of the actuator 7 is conventionally well known, the detailed description thereof will be omitted herein.

The EPB 2 generates an electric parking brake force by driving a wheel brake mechanism by the motor 10. Thus, the EPB 2 has an EPB-electric control unit (an EPB-ECU) 9 for controlling driving of the motor 10. The EPB-ECU 9 is also called an electric parking brake controller. The EPB-ECU 9 communicates with the ESC-ECU 8 via a Controller Area Network (CAN)

The wheel brake mechanism is a mechanical structure for generating a brake force in the vehicle brake device of the present embodiment. The front wheel brake mechanism has a structure that generates the service brake force by using operation of the service brake 1. The rear wheel brake mechanism has a structure that generates the brake force by using not only operation of the service brake 1 but also operation of the EPB 2. The front wheel brake mechanism is a conventional wheel brake mechanism, which has no mechanism for generating the electric parking brake force. Accordingly, the description thereof will be omitted herein and only the rear wheel brake mechanism will be described below.

The rear wheel brake mechanism is used not only when the service brake 1 is operated but also when the EPB 2 is operated. A brake pads 11 made of a friction material (shown in FIG. 2) are pressed against a brake disk 12 (12RL, 12RR, 12FR, 12FL). The brake disk 12 (12RL, 12RR, 12FR, 12FL) that wears the brake pads is sandwiched by the brake pads. Accordingly, a brake force that is a frictional force between the brake pads 11 and the brake disc 12 is generated.

In the wheel brake mechanism, the motor 10 that is directly fixed to a body 14 of the W/C 6 in a caliper 13 as shown in FIG. 2. Then, a body 14 of the W/C 6 is push against the brake pads 11. Rotation of a spur gear 15 equipped on a driving shaft 10a results from rotation of the motor 10. Then, a rotational force (output) of the motor 10 is transmitted to a spur gear 16 engaged with the spur gear 15. This transmission of the rotational force cause the movement of the brake pads 11 and the generation of the electric parking brake force of the EPB 2.

The W/C 6 and the brake pads 11 are accommodated in the caliper 13. A part of an end face of the brake disc 12 is also accommodated in the caliper 13 so as to be sandwiched between the brake pads 11. The W/C 6 is configured to be introduced the brake fluid pressure through a passage 14b into a hollow portion 14a of the body 14 having a cylinder shape. The W/C pressure is generated in the hollow portion 14a that is the brake fluid accommodating chamber. An inside of the hollow portion 14a has a rotation shaft 17, a thrust shaft 18, and a piston 19 or the like.

One end of the rotation shaft 17 is connected to the spur gear 16 through an insertion hole 14c formed in the body 14. The rotary shaft 17 is rotated along with the rotation of the spur gear 16. A male screw groove 17a is formed on an outer circumferential surface of on an end, which opposite to another end of connected to spur gear 16, of the rotation shaft 17. On the other hand, another end of the rotation shaft 17 is inserted and journaled in the insertion hole 14c. Specifically, the insertion hole 14 is provided with an O-ring 20 and a bearing 21. As a result, leakage of the brake fluid through between the rotation shaft 17 and an inner wall surface of the insertion hole 14c may be prevented, and the another end of the rotation shaft 17 is journaled by the bearing 21.

The thrust shaft 18 is mainly composed of a nut made of a hollow cylindrical member. An inner wall surface of the thrust shaft 18 has a female screw groove 18a screwed with the male screw groove 17a of the rotation shaft 17. For example, the thrust shaft 18 is configured in the shape of a circular column or in the shape of a polygonal column shape with a rotation preventing key. Accordingly, the thrust shaft 18 may be prevent from rotating around the rotation center of the rotation shaft 17 while the rotation shaft 17 rotates. The male screw groove 17a engages the female screw groove 18a. Therefore, when the rotation shaft 17 is being rotated, this engagement enables a rotational force of the rotation shaft 17 to convert into a force causes the thrust shaft 18 to move in an axial direction of the rotation shaft 17. If movement of the motor 10 is stopped, a position of the thrust shaft 18 at the time motor stopped is lock due to a frictional force between the male screw groove 17a and the female screw groove 18a. Accordingly, if movement of the motor 10 is stopped when a target electric parking brake force is achieved, the thrust shaft 18 is held at a position at the time and thus a desired electric parking brake force is maintained, thereby making it possible to achieve self-locking (hereinafter called lock).

The piston 19 is arranged to surround an outer circumference of the thrust shaft 18. A shape of the piston 19 is a bottomed circular or polygonal tube. An outer circumferential surface of the piston 19 is arranged to be in contact with the inner wall surface of the hollow portion 14a formed in the body 14. In order to prevent leakage of the brake fluid between the outer circumferential surface of the piston 19 and the inner wall surface of the body 14, a seal member 22 is provided on the inner wall surface of the body 14. This structure allows the W/C pressure to be applied to an end face of the piston 19. The seal member 22 is used to generate a reaction force for returning the piston 19 during release control after lock control. The seal member 22 may keep a predetermine clearance between the brake disk 12 and the brake pad 11 even when the brake disk 12 inclines with respect to the direction perpendicular to an axis of rotation. In this case, it is necessary that the brake pad 12 and the piston 19 be pushed by the brake disc 12 within an elastic deformation amount of the seal member 22.

The piston 19 can prevent rotating around the rotation center of the rotation shaft 17 when the rotation shaft 17 rotates. One way is that the piston 19 has a key groove sliding in the rotation preventing key of the thrust shaft 18. Another way is that the thrust shaft 18 is formed in the shape of a polygonal column, and the piston 19 in the shape of fitting with the thrust shaft 18.

The brake pad 11 is arranged at a distal end of the piston 19. Accordingly, the piston 19 is configured to move the brake pad 11 in left and right directions of the FIG. 2 as the piston 19 moves. Specifically, the piston 19 is configured to move in the left direction of FIG. 2 as the thrust shaft 18 moves. The piston 19 is also configured to move in the left direction of FIG. 2 when an end of the piston 19 (i.e., the end thereof opposite to the end on which the brake pads 11 is arranged) is applied W/C pressure unrelated to a position of the thrust shaft 18. When the thrust shaft 18 is at a release position, which is a standby position during normal release (the motor 10 is not rotated) and a brake fluid pressure is not applied (i.e., W/C pressure=0) in the hollow portion 14a, the piston 19 moves in the right direction of FIG. 2. This movement is due to the elastic force of the seal member 22 described later. Then, the brake pad 11 can be separated from the brake disc 12. Further, when the motor 10 is rotated and the thrust shaft 18 is moved in the left direction of FIG. 2 from an initial position. Movement of the piston 19 in the right direction of FIG. 2 is restricted by the thrust shaft 18 that has moved from the release position. Therefore the brake pad 11 is maintained at a position corresponding to the trust shaft 18.

In this wheel brake mechanism, if the service brake 1 is operated, the brake pad 11 is pressed against the brake disk 12 by using the W/C pressure generated by such an operation. As a result, the service brake force is generated. Also, When the EPB 2 is operated, the motor 10 is driven and thus the spur gear 15 is rotated. Accordingly, the spur gear 16 and the rotation shaft 17 are rotated. As a result, the thrust shaft 18 is moved toward the brake disk 12 (in the left direction of FIG. 2) by engagement between the male screw groove 17a and the female screw groove 18a. Accordingly, a distal end of the thrust shaft 18 touches and presses against a bottom surface of the piston 19. The piston 19 is moved in the same direction as the thrust shaft 18. The brake pad 11 is pressed against the brake disc 12, and the electric parking brake force is generated thereby. Therefore, it is possible to construct a common wheel brake mechanism which generates the brake force by both operation of the service brake 1 and operation of the EPB 2.

In the wheel brake mechanism as described above, when the EPB 2 is operated and the thrust shaft 18 has not touched the piston 19 yet, a small load is applied to the thrust shaft 18 and thus a small load is applied to the motor 10. This state is a "no-load state" hereinafter. Also, a state where the thrust shaft 18 has touched the piston 19 is a "load-applied state."

Then, when the brake disk 12 is pressed by the brake pad 11 in the load-applied state where the thrust shaft 18 has touched the piston 19, the electric parking brake force is generated by the EPB 2 and a large load is applied to the motor 10. Accordingly, a current detection value through the motor 10 is changed depending on a magnitude of the load. Therefore, checking the current detection value through the motor 10 by a current sensor (not shown) may help to identify a state of application of the electric parking brake force by EPB 2.

A longitudinal acceleration sensor 25 is configured to detect acceleration in a longitudinal direction (traveling direction) of the vehicle and to output the detection signal to the EPB-ECU 9.

An M/C pressure sensor 26 is configured to detect a M/C pressure in the M/C 5 and to output the detection signal to the EPB-ECU 9.

A temperature sensor 28 is configured to detect a temperature of the wheel brake mechanism (e.g., the brake disc) and to output the detection signal to the EPB-ECU 9.

A wheel speed sensor 29 is configured to detect a rotation speed of each wheel and to output the detection signal to the EPB-ECU 9. The wheel speed sensor 29 is provided with each wheel in this embodiment. The detailed illustration or description thereof will be omitted herein.

A conventional microcomputer equipped with a CPU, a ROM, a RAM, an I/O mainly compose the EPB-ECU 9. The EPB-ECU 9 is configured to execute parking brake control that is to control rotation of the motor 10 using a program stored in the ROM or the like.

The EPB-ECU 9 operates the motor 10 according to a signal or the like indicating an operation state of a switch (SW) 23. An instrument panel (not shown) in a vehicle cabin has the operation SW23. Further, the EPB-ECU 9 executes lock control, release control or the like by using the current detection value through the motor 10. In addition, the EPB-ECU 9 determines which states of a wheel; if the EPB-ECU 9 executes lock control, wheel should be in a lock state by the lock control; if the EPB-ECU 9 executes the release control, a wheel should be in a released state (EPB released state) by the release control. Moreover, the EPB-ECU 9 outputs a signal for causing an indication lamp 24, which is provided on the instrument panel, to create various indications.

The vehicle brake device mainly generates the braking force, which is the service brake force by the service brake 1, applied to the vehicle during the vehicle traveling. The driver can not only activate but also release the electric parking brake force to push the operation SW 23. In this situation, activation of the electric parking brake keeps the vehicle stopped. That is, as the operation for the service brake 1, if the brake pedal 3 is operated by the driver when the vehicle is traveling, the vehicle brake device causes a brake fluid pressure generated in the M/C 5 to be delivered to the W/C 6, and generates the service brake force thereby. As the operation for the EPB 2, the vehicle brake device drives the motor 10 to move the piston 19. This result that the brake pad 11 is pressed against the brake disc 12 and a wheel is the locking state by the electric parking brake. This may also result that the brake pad 11 is separated from the brake disc 12 to release the electric parking brake force and the wheel is the released state.

The electric parking brake force generates by executing lock control. The electric parking brake force releases by executing release control. In the lock control, the electric parking brake force is generated while the motor 10 is rotated in one direction. When a desired electric parking brake force is generated by the EPB 2, the motor 10 has been stopped. In the release control, the motor 10 is rotated in another direction opposite to the one direction. As a result, the electric parking brake force, which is generated by EPB 2, is released.

If the driver depresses the brake pedal while the electric parking brake force is generated, a hydraulic brake force is also generated by the hydraulic brake mechanism. A surplus braking force may be generated in this case. Accordingly, the electric parking brake force may be reduced depending on a pressure value of the brake fluid detected by the M/C pressure sensor 26. If the M/C pressure sensor 26 is malfunctioning or not equipped, the pressure value of the brake fluid cannot be detected correctly.

Therefore, a technique for estimating a fluid pressure in the hydraulic brake even when the pressure value of the brake fluid is not detected correctly by the fluid pressure sensor will be described below. Specifically, the EPB-ECU 9 executes varieties of control according to a program stored in the ROM (not shown) built therein using the brake system configured as described above.

The EPB-ECU 9 is applied to the vehicle. The vehicle has a hydraulic brake being capable of generating a hydraulic braking force that is a braking force converted from the fluid pressure to a wheel of the vehicle. The vehicle also has an electric parking brake being capable of generating an electric braking force that is a braking force different from the hydraulic braking force to the wheel by a wheel brake mechanism driven by the motor 10. The EPB-ECU 9 determines a current target value that is a target value of an electric current through the motor 10 by using a target braking force (e.g., determined by using a gradient of a road and the like). The EPB-ECU 9 controls the electric parking brake (EPB 2) by using the current target value.

When the M/C pressure sensor 26 is working properly, the EPB-ECU 9 modifies the current target value by using a fluid pressure detection value by the M/C pressure sensor 26. An EPB pressure caused by the electric parking brake is decreased by an amount corresponding to the fluid pressure in this modification. In this way, it may be possible to reduce a surplus braking force due to generating the electric parking brake force along with the hydraulic brake force.

When the M/C pressure sensor 26 is working improperly, the EPB-ECU 9 estimates the fluid pressure of the hydraulic brake by using the current detection value through the motor 10. The EPB-ECU 9 modifies the current target value by using the estimated fluid pressure in such a manner that the EPB pressure is decreased by an amount corresponding to the fluid pressure. In the following, the fluid pressure estimation in the no-load state will be described with reference to FIGS. 3A to 5, and then the fluid pressure estimation in the load-applied state will be described with reference to FIGS. 6 to 8.

Figure 3A:
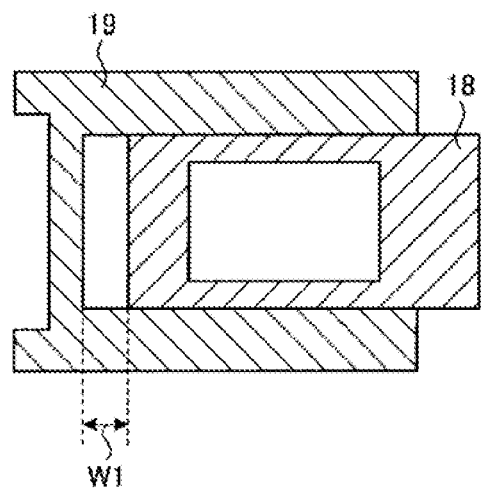
FIG. 3A is an explanatory view of a clearance between a thrust shaft and a piston in a wheel cylinder (W/C) according to the embodiment.
Figure 3B:
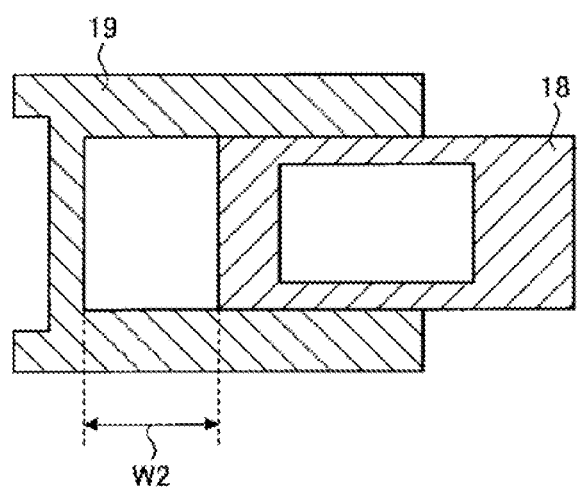
FIG. 3B is an explanatory view of a clearance between the thrust shaft and the piston in the W/C according to the embodiment.

FIG. 3A is an explanatory view of a clearance between the thrust shaft 18 and the piston 19 in the W/C 6 according to the embodiment. FIG. 3B is an explanatory view of a clearance between the thrust shaft 18 and the piston 19 in the W/C 6 according to the embodiment. FIG. 3A shows a clearance W1 between the thrust shaft 18 and the piston 19 in a no-load state and also in a state where there is no depression on the brake pedal 3 by the driver. FIG. 3B shows a clearance W2 between the thrust shaft 18 and the piston 19 when the driver depresses the brake pedal 3 from the above state. When the driver depresses on the brake pedal, a clearance between the thrust shaft 18 and the piston 19 increases from W1 to W2 in accordance with an amount of movement of the piston 19 in the left direction in FIG. 3A and FIG. 3B by a fluid pressure. Therefore, the fluid pressure (i.e., W/C pressure) can be estimated by using an amount of the clearance between the thrust shaft 18 and the piston 19 in the no-load state. The meaning of "estimated W/C pressure is calculated" is the same as the meaning of "W/C pressure is estimated" hereinafter.

Figure 4:
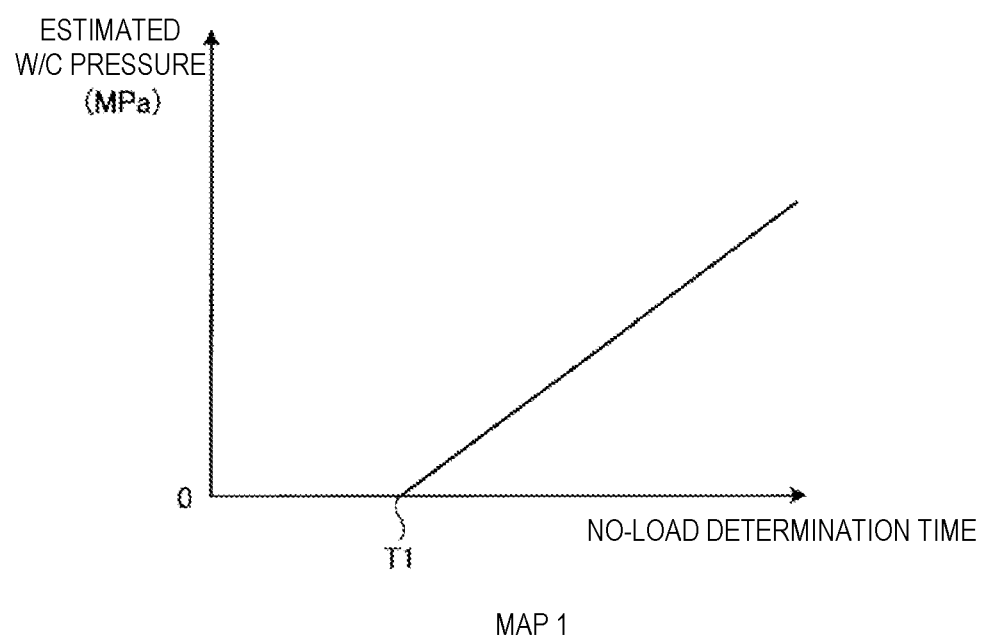
FIG. 4 is a map 1 showing a relationship between a no-load determination time and an estimated W/C pressure according to the embodiment.

FIG. 4 is a map 1 showing a relationship between a no-load determination time and an estimated W/C pressure according to the embodiment. The map 1 is stored in the EPB-ECU 9. In the map 1, the no-load determination time and the estimated W/C pressure (MPa) are correlated. Experiments or the like can make it possible to determine the variable of the map 1 including a value of T1, a gradient of a line segment representing a correspondence between the no-load determination time and the estimated W/C pressure. The EPB-ECU 9 can estimate the fluid pressure in the no-load state by using the map 1. The details thereof will be described below.

FIG. 5 is graphs explaining estimation of the W/C pressure in the no-load state according to the embodiment. FIG. 5A shows the course of change over time of a current detection value A through the motor 10. FIG. 5B shows the course of change over time in load determination. In the load determination, the term "operating load application" refers to a load-applied state when the EPB 2 is operating. The term "operating no-load" refers to a no-load state when the EPB 2 is operating. The term "non-operation" refers to a state where the EPB 2 is not operating. FIG. 5C shows the course of change over time of an estimated W/C pressure calculated by the EPB-ECU 9.

The EPB 2 is in the non-operation state at or after time t0 before time t1; The EPB 2 is started operating at the time t1. The current detection value through the motor 10 is changed as shown in FIG. 5A thereafter. A predetermined threshold for the current detection value thorough the motor 10 may be previously set in the wheel brake mechanism. The predetermined threshold is used to determine whether the distal end of the thrust shaft 18 has touched the piston 19 by the motor 10.

The EPB-ECU 9 calculates an estimated W/C pressure. In this calculation, the EPB-ECU 9 uses a length of time from when the motor 10 starts to move at time t1 until the current detection value initially reaches the predetermined threshold except an inrush current through the motor 10 starts to move. The length of time that is called no-load determination time is equal to from time t1 to time t5. The EPB-ECU 9 also uses the map 1 of FIG. 4. The predetermined threshold is set in accordance with a fluid pressure of 3 MPa herein, Times t2, t3, t4, t5 and t6 correspond one to one to fluid pressures of 0 MPa, 1 MPa, 2 MPa, 3 MPa and 4 MPa in FIG. 5A. In this example, the EPB-ECU 9 calculates the estimated W/C pressure as 3 MPa since the current detection value through motor 10 reaches the predetermined threshold at the time t5 as shown in FIG. 5C. The EPB-ECU 9 can estimate the fluid pressure in the no-load state like this example. In addition, the EPB-ECU 9 modifies the current target value by using the estimated W/C pressure in such a manner that the EPB pressure is decreased by an amount corresponding to the estimated W/C pressure.

Estimation of a fluid pressure during the load-applied state will be described with reference to FIGS. 6 to 8 as follows. FIG. 6 is an explanatory view of a relationship between a change in pedal force and a change in fluid pressure or EPB pressure according to the embodiment. A magnitude as shown at the top of FIG. 6 stands for a reaction force from the brake disc 12 (shown in FIG. 2) to the W/C 6 (brake pad 11) at any moment during the load-applied state. A magnitudes as shown in FIG. 6A stands for a fluid pressure and an EPB pressure when a pedal force on the brake pedal 3 by the driver is constant.

In load-applied state, if the driver increases pedal force on the brake pedal 3, the fluid pressure increases and the EPB pressure decreases correspondingly as shown in FIG. 6B. In addition, if the pedal force on the brake pedal 3 by the driver is decreased, the fluid pressure is decreased and the EPB pressure is increased correspondingly as shown in FIG. 6C.

There is a correlation between a rate of change in the fluid pressure and a rate of change in the EPB pressure. Also, there is a correlation between the rate of change in the EPB pressure and a rate of change in current detection value through the motor 10. Therefore, the rate of change in the fluid pressure, which is the W/C pressure change rate, can be estimated by using the rate of change in the current detection value through the motor 10 (hereinafter "current change rate") in the load-applied state.

FIG. 7 is a map 2 showing a relationship between a current change rate and an estimated W/C pressure change rate according to the embodiment. The map 2 is previously stored in the EPB-ECU 9. As shown the map 2, the current change rate (A/s) and the estimated W/C pressure change rate (MPa/s) are correlated. Experiments or the like can make it possible to determine the variable of the map 2 including a gradient of a line segment representing a correspondence between the current change rate (A/s) and the estimated W/C pressure change rate (MPa/s). The EPB-ECU 9 can estimate the fluid pressure in the load-applied state by using the map 2. The details thereof will be described below.

FIG. 8A to 8C are graphs explaining estimation of a W/C pressure in the load-applied state according to the embodiment. The graph in FIG. 8A shows the course of change over time of a current detection value through the motor 10 in the load-applied state. The graph in FIG. 8B shows the course of change over time in pedal force determination. The graph in FIG. 8C shows the course of change over time of an estimated W/C pressure calculated by the EPB-ECU 9.

The pedal force is constant from time t10 to time t11 (FIG. 8B). The estimated W/C pressure is also constant from time t10 to time t11 (FIG. 8A). The pedal force is increasing from time t11 to time t12 (FIG. 8B). The EPB-ECU 9 calculates the estimated W/C pressure as follows.

The EPB-ECU 9 calculates the estimated W/C pressure change rate by using the current change rate and the map 2 (FIG. 7). Then, the EPB-ECU 9 calculates the estimated W/C pressure by the following equation (1).

$$\text{Estimated } W/C \text{ Pressure} = \text{Last Value of Estimated } W/C \text{ Pressure} + \text{Estimated } W/C \text{ Pressure Change Rate} \times \text{Sampling Time} \quad (1)$$

The pedal force is constant (FIG. 8B) and the estimated W/C pressure is also constant (FIG. 8A) from time t12 to time t13. The pedal force is decreasing from time t13 to time t14 (FIG. 8B). A calculation way of the estimated W/C pressure when the pedal force is decreasing is the same manner as a calculation way when increasing. The pedal force is constant (FIG. 8B) and the estimated W/C pressure is also constant (FIG. 8A) at or after time t14. In this way, the EPB-ECU 9 can estimate the fluid pressure in the load-applied state.

Figure 9:
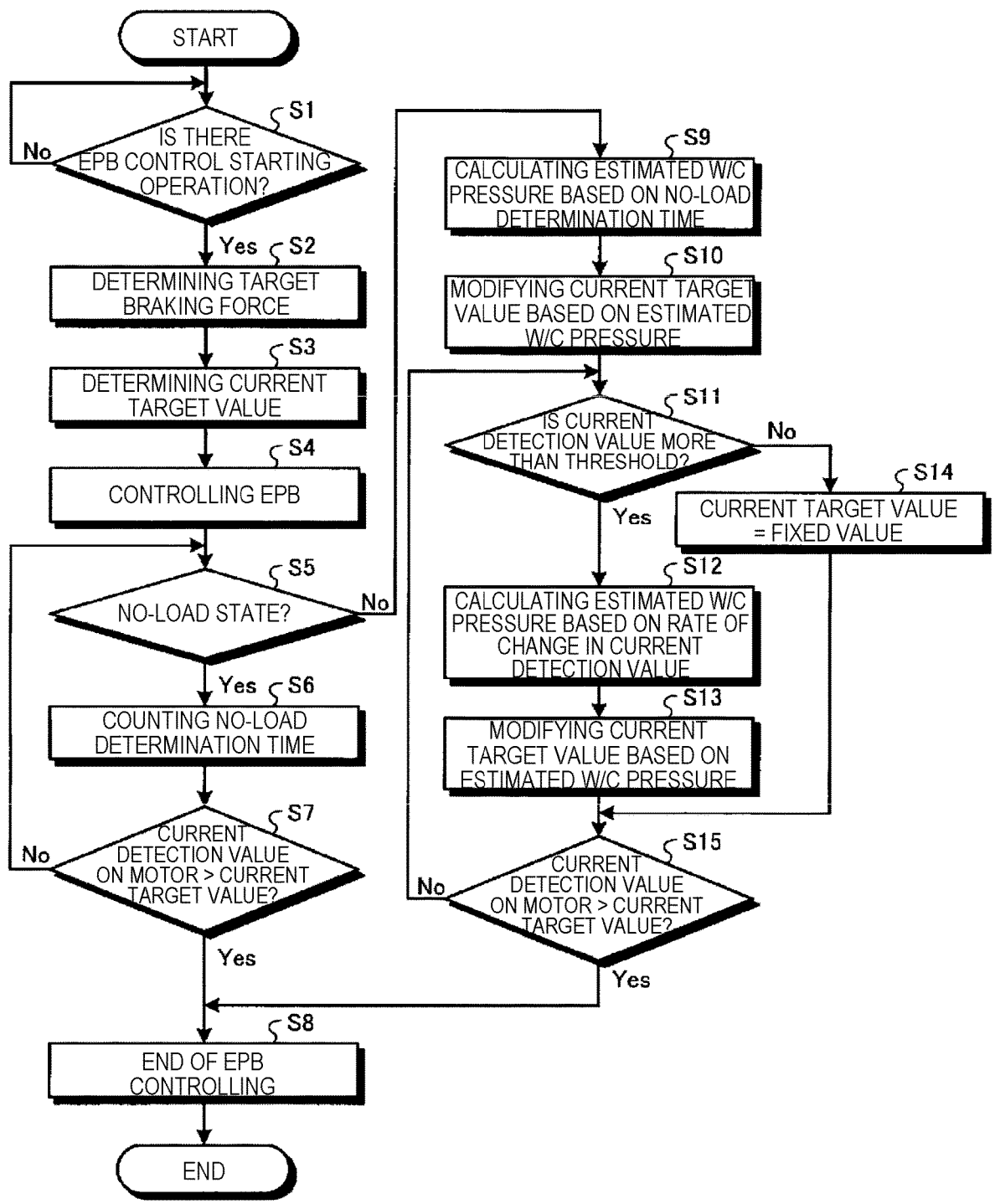
FIG. 9 is a flow chart showing a process executed by a brake control device according to the embodiment.

A process executed by the brake control device according to the embodiment is described with reference to FIG. 9. FIG. 9 is a flowchart showing the process executed by the brake control device according to the embodiment.

The EPB-ECU 9 determines whether there is an EPB control starting operation in a step S1. If the EPB-ECU 9 determines that there is the EPB control starting operation, which means "Yes" in the step S1, the process moves to a step S2. If the EPB-ECU 9 determines that there is no the EPB control starting operation, which means "No" in the step S1, the process returns to the step S1.

The EPB-ECU 9 determines a target braking force in the step S2. The EPB-ECU 9 determines a current target value through the motor 10 by using the target braking force in a step S3. The EPB-ECU 9 starts EPB control by using the current target value in a step S4.

The EPB-ECU 9 determines whether the wheel brake mechanism is in the no-load state in a step 5. If the EPB-ECU 9 determines that the wheel brake mechanism is in the no-load state, which means "Yes" in the step 5, the process moves to a step S6. If the EPB-ECU 9 determines that the wheel brake mechanism is not in the no-load state, which means "No" in the step 5, the process moves to a step S9. In the step 5, the no-load state is considered as a period of term from the time t1 to the time t5 in FIG. 5A. At time t1, the motor 10 starts to move. At time T5, The current detection value through the motor 10 initially reaches the predetermined threshold except an inrush current right after the time t1.

The EPB-ECU 9 counts the no-load determination time in the step S6. The EPB-ECU 9 determines whether the current detection value through the motor 10 exceeds the current target value in a step 7. If the EPB-ECU determines the current detection value exceeds the current target value, which means "Yes" in FIG. 7, the process moves to a step S8. If the EPB-ECU determines the current detection value does not exceed the current target value, which means "No" in FIG. 9, the process returns to the step S5. In the step S8, the EPB-ECU 9 ends the EPB control. (i.e., locking of a wheel is completed.)

The EPB-ECU 9 calculates an estimated W/C pressure by using the no-load determination time (FIG. 5B) and the map 1 (FIG. 4) in the step 9. In a step S10, the EPB-ECU 9 modifies the current target value by using the estimated W/C pressure. In this calculation, the EPB pressure is decreased by an amount corresponding to the estimated W/C pressure.

The EPB-ECU 9 determines whether the current detection value through the motor 10 is greater than or equal to the predetermined threshold in a step S11. If the EPB-ECU 9 determines the current detection value is the predetermined threshold is greater than or equal to the predetermined threshold, which means "Yes" in the step S11, the process moves to a step S12. If the EPB-ECU 9 determines the current detection value is below the predetermined threshold, which means "No" in the step 11, the process moves to a step S14. In the step S11, if the driver depresses the brake pedal 3 rapidly during the load-applied state, the current detection value through the motor 10 could become below the predetermined threshold and thus the process moves to the step S14. In this case, the no-load state could happen because the distal end of the thrust shaft 18 may parts from the piston 19 momentarily. Accordingly, it may be impossible to estimate the W/C pressure. At this time, the current target value is set to a predetermined fixed value in the step S14. The fixed value is previously set to a value, which can prevent an excessive load from being applied to the actuator 7, the caliper 13 and the like. The fixed value may set in consideration of strength of such parts. After the step S14, the process moves to a step S15. That is, after the step S14, the EPB-ECU 9 stops calculating the estimated W/C pressure until the current detection value through the motor 10 becomes greater than or equal to the predetermined threshold (until the step S11 becomes Yes), so that the current target value is maintained as the fixed value.

In the step S12, the EPB-ECU 9 calculates an estimated W/C pressure change rate by using a rate of change in current detection value (current change rate) and the map 2 in FIG. 7, and then calculates an estimated W/C pressure by the estimated W/C pressure change rate and the equation (1) as described above.

The EPB-ECU 9 modifies the current target value by using the estimated W/C pressure in such a manner that the EPB pressure is decreased by an amount corresponding to the estimated W/C pressure in a step S13. The estimated W/C pressure is calculated in the step S12. After the step S13, the process moves to a step S15.

The EPB-ECU 9 determines whether the current detection value through the motor 10 exceeds the current target value in the step S15. If the EPB-ECU 9 determines the current detection value exceeds the current target value, which means "Yes" in the step S15, the process moves to a step S8. If the EPB-ECU 9 determines the current detection value does not exceeds the current target value, which means "No" in the step S15, the process returns to the step S11.

As described above, the EPB-ECU 9 (i.e., brake control device) of the present embodiment enable a fluid pressure in the hydraulic brake to be estimated even if a correct fluid pressure detection value is not obtained by a fluid pressure sensor including M/C pressure sensor 26. Therefore, for example, a fluid pressure in the hydraulic brake can be estimated without a fluid pressure sensor. As a result, it is possible to achieve reduction in size and cost of the brake device. Also, even if the M/C pressure sensor 26 has failed, a fluid pressure in the hydraulic brake can be estimated. Accordingly, it is possible to avoid a situation where an excessive load is applied to the actuator 7, the caliper 13 and the like.

For example, when the M/C pressure sensor 26 is operating correctly, the EPB-ECU 9 may modify the current target valve by using a fluid pressure detection value detected by the M/C pressure sensor 26 in such a manner that the EPB pressure is decreased by an amount corresponding to the fluid pressure (not shown in FIG. 9). In this way, it may be possible to reduce a surplus braking force due to generating the electric parking brake force along with the hydraulic brake force.

Further, when the M/C pressure sensor 26 works incorrectly, the EPB-ECU 9 may calculate the estimated W/C pressure as shown in the flowchart of FIG. 9 and then modify the current target value by using the estimated W/C pressure in such a manner that the EPB pressure is decreased by an amount corresponding to the estimated W/C pressure. In this way, even if the M/C pressure sensor 26 works incorrectly, it is possible to reduce a surplus brake force due to generating the electric parking brake force along with the hydraulic brake force.

For example, the following two techniques may make it possible to determine whether the M/C pressure sensor 26 works correctly. Firstly, the M/C pressure sensor 26 outputs a file flag due to a self-diagnosis function in the case of a failure. Secondly, it is determined whether a fluid pressure detection value by the M/C pressure sensor 26 or a change amount thereof is an abnormal value. In the second technique, for example, when the M/C pressure sensor 26 outputs an abnormal value that includes too large detection value compared to a normal value, the abnormal value does not need to use to estimate the W/C pressure. This may enable the EPB pressure to maintain properly by using the estimated W/C pressure. Therefore, it may be possible to avoid a situation where the vehicle unintentionally moves because the EPB pressure is excessively decreased.

Also, the EPB-ECU 9 may calculate the estimated W/C pressure by using above-described algorithm during the load-applied state as well as the no-load-applied state.

Further, if the driver depresses the brake pedal 3 rapidly during the load-applied state, the current detection value through the motor 10 decreases below the threshold, and then the W/C pressure cannot be estimated. In this case, the current target value may fix so that an excessive load is prevented from being applied on the actuator 7, the caliper 13 and the like.

The EPB-ECU 9 may modify the estimated W/C pressure by using a friction amount of the brake pads 11 (i.e., a friction material) in the wheel brake mechanism. This may enable to reduce the influence of wear of the brake pad 11 on the estimated W/C pressure. In this case, the map 1 or the map 2 may be modified by using an amount of wear of the brake pads 11, and a plurality of maps may be provided.

Further, other controllers including the ESC-ECU 8 may use the estimated W/C pressure, which calculated by the EPB-ECU 9, for some controls. For example, the ESC-ECU 8 may execute the control by using a fluid pressure detection value detected by the M/C pressure sensor 2. In this case, if the M/C pressure sensor 26 has failed, the ESC-ECU 8 can use an estimated W/C pressure calculated by the EPB-ECU 9 instead of the fluid pressure detection value so that the ESC-ECU 8 continues to execute the control.

Although the embodiments of the present application have been illustrated in the foregoing, the embodiments are only examples and are not intended to limit the scope of the application. The embodiments can be implemented in various other modes, and also various omissions, substitutions, combinations and changes therein can be made without departing from the spirit and scope of the application. In addition, specifications including structure, type, number and the like of each of the configurations, shapes, and the like can be appropriately modified.

For example, the wheel to which the EPB is applied is not limited to the rear wheels and may be the front wheels. Also, the estimated W/C pressure may be calculated not only when the vehicle is parked, but also when the vehicle is traveling. Further, the estimated W/C pressure may be modified by other factors, such as a temperature of the caliper 13 and a gradient of a road. Further, depending on types of the caliper 13 (types of structure, material and the like), the map 1 and the map 2 may be specially prepared.

In addition, after operating the EPB 2 until immediately before an EPB pressure is generated in order to allow the EPB-ECU 9 to calculate an estimated W/C pressure, the EPB-ECU 9 may calculate an estimated W/C pressure and then the calculated estimated W/C pressure may be used for the predetermined control in the ESC-ECU 8.

The invention claimed is:

1. A brake control device to be applied to a vehicle, the vehicle having a hydraulic brake capable of generating a hydraulic braking force which is braking force converted from a fluid pressure to a wheel of the vehicle; and an electric parking brake capable of generating an electric braking force which is braking force different from the hydraulic braking force to the wheel and is provided by a wheel brake mechanism driven by a motor,
    wherein the brake control device comprises an electric parking brake controller configured to:
    determine a current target value which is a target value of an electric current through the motor, by using a target braking force,
    control the electric parking brake by using the current target value, and
    estimate the fluid pressure in the hydraulic brake by using a detection current which is a detection value of an electric current through the motor.

2. The brake control device according to claim 1, wherein a predetermined threshold for the current detection value through the motor is set in the wheel brake mechanism in order to determine whether a distal end of a thrust shaft which is moved by the motor has touched a piston, wherein the electric parking brake controller is configured:

to estimate the fluid pressure in the hydraulic brake, by using a length of time from when the motor starts to move until when the detection current initially reaches the predetermined threshold except an inrush current through the motor right after the motor starts to move.

3. The brake control device according to claim 2, wherein the electric parking brake controller is configured:

to estimate the fluid pressure in the hydraulic brake, by using a rate of change in the current detection value after the current detection value initially reaches the predetermined threshold except the inrush current right after the motor starts to move.

4. The brake control device according to claim 2, wherein the electric parking brake controller is configured:

to stop estimating the fluid pressure in the hydraulic brake until the current detection value reaches the predetermined threshold again and to set the current target value to a predetermined fixed value if the current detection value is decreased below the predetermined threshold at the rate of change of a predetermined value or more after the current detection value initially reaches the predetermined threshold except the inrush current right after the motor starts to move.

5. The brake control device according to claim 1, wherein the electric parking brake controller is configured:

to modify the estimated fluid pressure by using a friction amount of a friction material in the wheel brake mechanism.

6. The brake control device according to claim 1, further comprising:

an additional controller different from the electric parking brake controller, configured to use the fluid pressure in the hydraulic brake estimated by the electric parking brake controller for predetermined control.

7. The brake control device according to claim 1, wherein the vehicle is equipped with a fluid pressure sensor for detecting the fluid pressure, wherein the electric parking brake controller is configured:

to modify the current target value by using the fluid pressure detection value which is a detection value of the fluid pressure by the fluid pressure sensor if the fluid pressure sensor is operating correctly; and to estimate the fluid pressure in the hydraulic brake by using the current detection value and to correct the current target value by using the estimated fluid pressure if the fluid pressure sensor is operating incorrectly.

* * * * *